Sept. 6, 1938.   C. A. RUESENBERG ET AL   2,129,361
FRICTION CLUTCH
Filed April 13, 1937   2 Sheets-Sheet 2
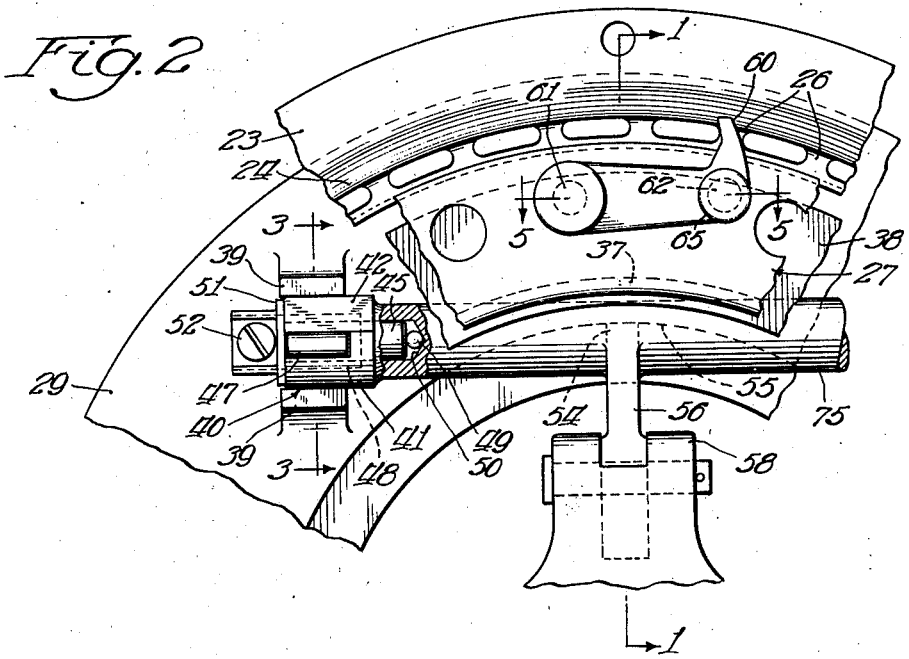
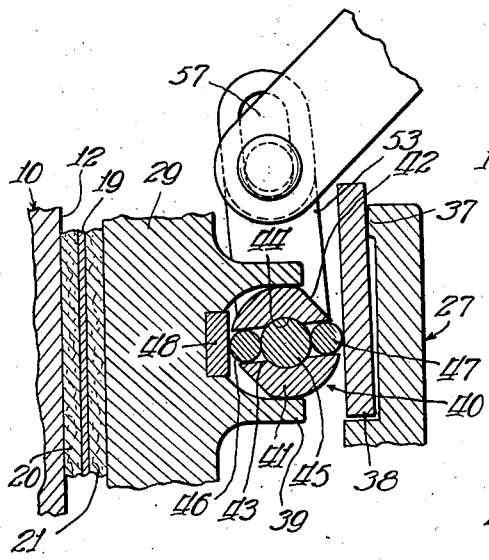
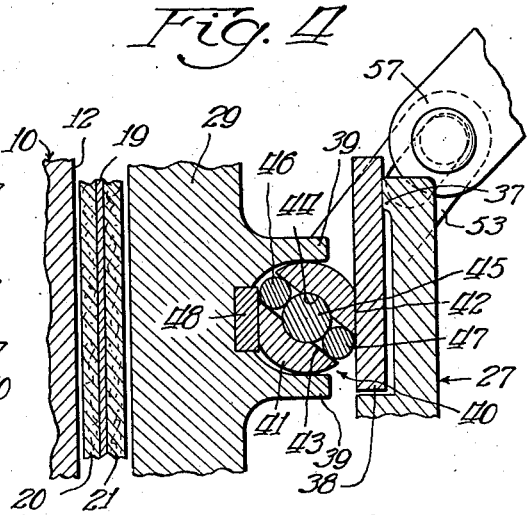
Inventors:
Carl A. Ruesenberg and
Martin Willene.
By: Edward C. Fitzpatrick
Atty.

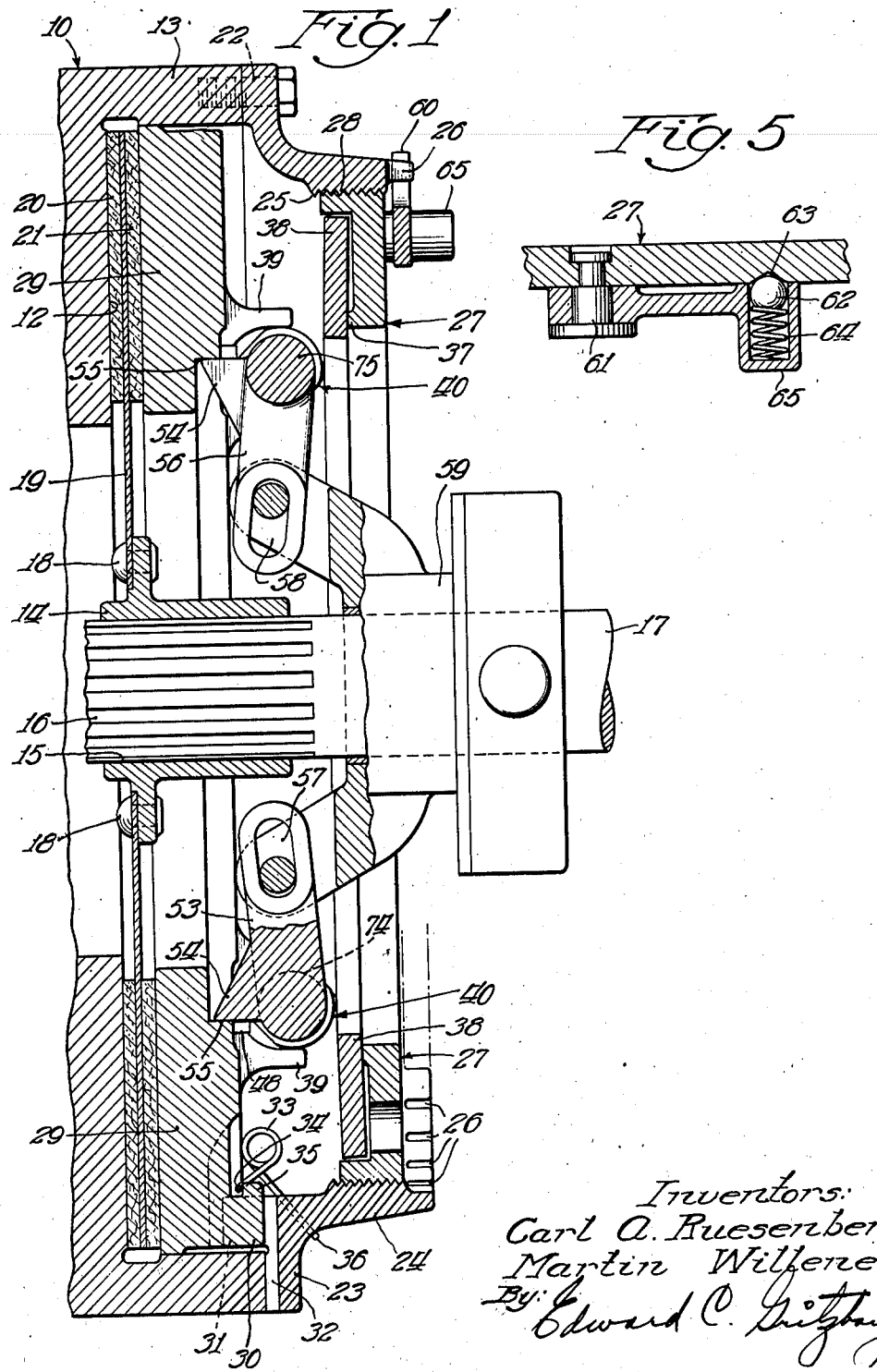

Patented Sept. 6, 1938

2,129,361

UNITED STATES PATENT OFFICE 2,129,361

FRICTION CLUTCH

Carl A. Ruesenberg and Martin Willene, Rockford, Ill., assignors to Borg-Warner Corporation, Chicago, Ill., a corporation of Illinois Application April 13, 1937, Serial No. 136,595

11 Claims. (Cl. 192—68)

This invention relates to clutches and particularly to control means therefor.

Friction clutches as used at present are comprised generally of a fly-wheel having a friction surface, a clutch plate splined to a driven shaft and adapted to contact the fly-wheel friction surface, a pressure plate on the other side of said clutch plate adapted to be moved into engagement with the clutch plate to provide driving engagement between the fly-wheel pressure plate and clutch plate when the pressure plate is urged toward the fly-wheel. Included in the combination there is also some means for actuating the pressure plate. One form of pressure plate actuating means comprises a ring secured to the fly-wheel, and a plurality of cams between the ring and pressure plate which may be actuated to increase the distance between the ring and pressure plate and thereby to move the pressure plate and clutch plate against the fly-wheel. It has been found, however, that due to the line contact existing between the cams, pressure plate and ring, the cams soon wear to such an extent as to necessitate an adjustment of the ring to a position nearer the fly-wheel friction surface in order to obtain full engagement of the clutch plate therewith.

It is the object of this invention to provide an improved cam and ring construction for a clutch which reduces the wear on the clutch actuating parts and thereby greatly increases the period between adjustments of the ring.

A feature of the invention is a cam, the operative surfaces of which are comprised of rollers which reduce materially the friction thereat.

Another feature of this invention is a yieldable ring construction which automatically takes up wear in the cam surfaces and makes for a less critical adjustment of the ring.

Another feature of the invention is a ring and support therefor, wherein the ring can be made lighter and consequently of a better grade of material for the purpose for which it is designed without greatly increasing the cost of the clutch.

These and other features and objects will become apparent from the following description when taken together with the accompanying drawings which form a part thereof and in which:

Fig. 1 is a side elevation in section of a clutch embodying the novel cam and ring construction of this invention;

Fig. 2 is a fragmental front elevation of the clutch of Fig. 1 showing the cam in detail;

Fig. 3 is a side elevation in section through the cam and a fragment of the clutch showing the cam in its operative position;

Fig. 4 is an elevation in section similar to Fig. 3, but showing the cam in its inoperative position; and Fig. 5 is a section through the ring-adjusting pawl taken along the line 5—5 of Fig. 2.

Referring now to Fig. 1, 10 is a fly-wheel or other engine-driven member having a friction surface at 12 and a flange 13. Concentric with fly-wheel 10, is a hub 14 having internal splines 15 in operative engagement with external splines 16 on a driven shaft 17. Secured to hub 14, as by rivets 18 or other suitable fasteners, is a disc 19 having an annular portion which is commensurate with friction surface 12 of fly-wheel 10, covered on both sides with suitable friction material 20 and 21.

Secured to flange 13 by bolts 22 or otherwise, is a flanged ring 23, the flanged portion 24 of which is provided with fine threads 25, and the extremity of which is notched as at 26 for a purpose to be hereinafter described. A ring 27 having external threads 28 in engagement with threads 25 of ring 23 is positioned within flange 24.

Between ring 23 and friction surface 21 of disc 19, is located a pressure plate 29 which is provided with circumferentially spaced tongues 30. Ring 23 is provided with corresponding forks 31 which engage tongues 30 and constitute a driving connection between pressure plate 29 and ring 23. A clearance 32 is provided between the end of each tongue 30 and the bottom of each fork 31 to allow pressure plate 29 to move axially into and out of engagement with friction surface 21. Pressure plate 29 is normally maintained out of contact with friction surface 21 by means of a light torsion spring 33, one end 34 of which engages an extension 35 on tongue 30 and the other end 36 of which extends through a suitable aperture in ring 23 and engages the outer surface thereof.

Threaded member 27 is provided with a boss 37 against which rests a ring 38 made of spring steel or the like. Projecting to the right from pressure plate 29 are a plurality of bearings 39 in which are journalled cams 40. Cams 40 bear against ring 38 and also against the bottom of bearings 39 and are used to urge pressure plate 29 toward fly-wheel 10 to engage the clutch.

A typical cam is shown in detail in Figs. 2, 3 and 4, and reference to these figures is now made in connection with the detailed description of the cam immediately following. The main portion tion of cam 40 is comprised a cylinder 41 having diametrically opposed flattened portions 42. At the point where the flattened portions 42 join the cylindrical portion are located radial slots 43 which join a central circular aperture 44. A roller 45 is inserted in aperture 44 and is free to rotate therein. Smaller rollers 46 and 47 are inserted in slots 43 adjacent roller 45 and are likewise free to rotate in the slots. The dimensions of slots 43 and aperture 44 are so chosen that the sum of the diameters of the rollers is at least equal to the diameter of cylindrical portion 41 and preferably slightly larger.

The bottom of bearing 39 is provided with a hardened insert 48 which cooperates with roller 46 and tends to reduce wear at that point. Central roller 45 is made longer than rollers 46 and 47 and engages at its inner end a ball 49 which is set in a conical seat 50 and which acts to reduce friction between the inner end of roller 45 and the corresponding end of aperture 44. The rollers are held against axial movement in their respective apertures by a closure member 51 which is secured by a screw or other fastener 52 to pressure plate 29. A lever 53 secured to cam 40 is used to rock the cam to its operative or inoperative position.

Rotation of cam 40 in one direction is limited by the reduced portions 42 thereof, and reverse rotation is limited by a stop 54 (Fig. 1) on lever 53, which engages a shoulder 55 on pressure plate 29. Stop 54 is so located, however, that it permits cam 40 to be rotated slightly beyond the point at which the line of pressure on rollers 46 and 47 passes through the center of the cam, thereby generating a couple which tends to assist the rotation in the said reverse direction.

The operation of the cam is as follows:

With the cam in its inoperative position, that is, in the position wherein portions 42 of the same are in contact with ring 38 and insert 48, it will be observed that pressure plate 29 is out of contact with friction surface 21 of disc 19 and consequently the clutch is not operated. As the cam is rotated in a counterclockwise direction, as viewed in Figs. 3 and 4, however, the diameter of the cam increases and tends to press pressure plate 29 against friction surface 21. Very early in the rotation, however, contact between cam 40 and ring 38 and insert 48 is established by rollers 46 and 47. This contact is maintained for the remainder of the rotation of the cam in this direction and during full operation of the clutch. Since ring 38 and insert 48 are stationary with respect to the cam, rollers 46 and 47 will rotate, as viewed in Figs. 3 and 4 in a clockwise direction. This rotation will be transmitted to the central roller 45 which accordingly, will be rotated in a counterclockwise direction. Thus, sliding friction at the operative points on cam 40 is converted into rolling friction which causes considerably less wear and which offers much less resistance to the operation of the clutch. Although the rolling friction is converted into sliding friction between central roller 45 and its aperture 44, the contact between these sliding surfaces is not a line contact as at the operative surfaces of the cam, but it is a surface contact which greatly reduces the normal pressure thereat and hence results in very little wear. The operative surfaces can be made of very hard steel without requiring that the entire cam be made of the same material and hence the cost of the clutch is not materially increased by the use of the rollers. The number of rollers may be increased, but it should always be an odd number so that the end rollers rotate in the same direction and provide a rolling action with respect to their cooperating surfaces.

No means other than closure member 51 is required to retain rollers 46 and 47 in their respective slots. This is due to the fact that the slots are partially closed off by ring 38 and inserts 48, and that at no time is the opening between ring 38 and the edge of slot 43 sufficiently large to permit roller 47 to pass therebetween.

It is understood that as many cams may be used to operate the pressure plate as are required. In the form shown, however, four such cams are used. These cams are located at the ends of two parallel rods 74 and 75 which may be formed integrally with levers 53 and 56, respectively. The ends of levers 53 and 56 are suitably connected through toggles 57 and 58, or other means, to a sleeve 59 which is slidable on shaft 17. Sleeve 59 may be connected in any convenient manner to an exterior reciprocable control lever (not shown).

Since movement of pressure plate 29 against friction surface 21 is obtained through an increase in the distance between pressure plate 29 and ring 38, it is necessary to provide some means for adjusting the position of ring 38 with respect to friction surface 12 of fly-wheel 10. This is done by rotating flange 27 with respect to flange 24 of ring 23. As shown in Fig. 2, flange 27 is provided with one or more pawls 60 which are pivoted thereto as at 61. Pawls 60 are adapted to engage slots 26 in flange 24 and serve to lock flange 27 against further rotation with respect to flange 24 after the proper adjustment has been secured. Inertia forces will normally maintain pawl 60 in engagement with flange 24. When at rest and under conditions of low centrifugal forces, the engagement is maintained by a ball 62 (Fig. 5) which is held in engagement with a recess 63 in flange 27 by a compression spring 64 located in a pocket 65 of pawl 60.

Once the proper adjustment of flange 27 with respect to friction surface 12 of fly-wheel 10 is obtained, no further adjustment will be required for a considerable period. This is brought about not only by the reduction in wear in the cam surface, but also by the construction of ring 38 and flange 27. As shown in Figs. 3 and 4, ring 38 is fulcrumed on boss 37 of flange 27 and the length and location of roller 47 is such that its center of pressure is eccentric to the fulcrum. Since there are a number of such rollers in contact with ring 38, and since ring 38 is made of spring steel, the ring will be deformed until its outer edge contacts the adjacent surface of the flange 27 which serves as a stop. The initial adjustment of ring 38 may therefore be made such that ring 38 is as close as possible to surface 12 of fly-wheel 10, and subsequent wear of the cam surfaces will then be taken up by the resistance to deformation of ring 38. The ring therefore is not merely a stop member against which cam 40 is rotated, but it is also a take-up member for wear on the cam.

It is understood that the foregoing description is merely illustrative of a preferred embodiment of the invention and that the scope of the invention is not to be limited thereto, but is to be determined by the appended claims.

We claim:

1. In a clutch, a driven member, a pressure plate, a driving member, a ring mounted on said driving member, means for actuating said pressure plate to press said driven member against the driving member for rotation therewith, said means comprising a plurality of cams between said pressure plate and ring, each of said cams comprising a cylindrical member having diametrically opposed parallel flattened portions and each having a slot extending thereacross from opposed ends of the flattened portions, and a plurality of coacting rollers therein, the shape of the cam being such as to cause the outer rollers to contact the ring and pressure plate when the cam is rotated to actuate the pressure plate.

2. In a clutch, a driven member, a pressure plate, a driving member, a ring mounted on said driving member, and means for actuating said pressure plate to press said driven member against the driving member for rotation therewith, said means comprising a plurality of cams between said pressure plate and ring, each of said cams having a slot and an odd number of coacting rollers therein so that the end rollers rotate in the same direction, the central of said rollers being fixed against lateral movement and the remainder of said rollers being free to move laterally, said cam being shaped to constitute said end rollers the operative means for actuating said pressure plate when the cam is rotated.

3. In a clutch, a driven member, a pressure plate, a driving member, a ring mounted on said driving member, and means for actuating said pressure plate to press said driven member against the driving member, said means comprising a plurality of cams between said pressure plate and ring, each of said cams having a slot through one end thereof, a plurality of rollers in said slot and adapted to engage said pressure plate and ring, and a retaining wall for the rollers to prevent axial movement thereof in the slot, said wall being fixed on said pressure plate.

4. In a clutch, a driven member, a pressure plate, a driving member, a ring mounted on said driving member, and means for actuating said pressure plate to press said driven member against said driving member for rotation therewith, said means comprising a plurality of cams between said pressure plate and ring, a concentric aperture in the end of each of said cams, diametrically opposed slots connecting the aperture with the outer surface of each of said cams, and cylindrical rollers in said apertures and slots, the combined diameters of the rollers being greater than the greatest transverse dimension of the cam to constitute the rollers the operative surfaces of the cam when the pressure plate is actuated, and a retaining means on the pressure plate for preventing axial movement of the rollers in the cam.

5. In a clutch, a combination as described in claim 4, the rollers in the central apertures being longer than the rollers in the slots, and a thrust bearing at the inner ends of the apertures for taking the thrust exerted by said retaining means.

6. In a clutch, a driven member, a pressure plate, a driving member, a ring mounted on said driving member, a tempered steel ring between said first mentioned ring and pressure plate, a boss on said first mentioned ring of lesser diameter than the mean diameter of the tempered steel ring and in engagement therewith, a plurality of cams between the pressure plate and tempered steel ring for actuating the pressure plate to press the driven member against the driving member for rotation therewith, the center of pressure of the cams being located on a circle the diameter of which is greater than the diameter of the boss, whereby to deform said tempered steel ring when the cams are operated to actuate the pressure plate and cause the tempered steel ring to act as a spring.

7. In a clutch, a driven member, a pressure plate, a driving member, a ring mounted on said driving member, a wear-resistant and resilient ring between said first mentioned ring and pressure plate, a boss on said first mentioned ring of lesser diameter than the mean diameter of the tempered steel ring and in engagement therewith, a plurality of cams between the pressure plate and second ring for actuating the pressure plate to press the driven member against the driving member for rotation therewith, the center of pressure of the cams being located on a circle the diameter of which is greater than the diameter of the boss whereby to deform said tempered steel ring when the cams are operated to actuate the pressure plate and cause the tempered steel ring to act as a spring, and means on at least one of said cams for causing the pressure to be transmitted from the tempered steel ring to the pressure plate through substantially frictionless rolling surfaces.

8. Cam means for actuating a clutch, said means comprising a cylinder having conjoined radial slots and having diametrically opposed parallel flattened portions, an odd number of friction-reducing rollers in the slots in contact with one another and protruding beyond the periphery of the cylinder, the central of said rollers being of greater diameter than the remainder of said rollers, and being fixed against lateral movement means tending to compress said rollers, means for rocking the cylinder between said compressing means to spread said compressing means and thereby to actuate the clutch, and means for limiting the rocking movement of the cylinder whereby said rollers are maintained in said slots by the compressing means.

9. Cam means as described in claim 8, said compressing means comprising a pressure plate, a resilient ring and means for deforming the ring to generate a restoring force therein which opposes the action of the compressing means.

10. In a friction clutch, a driving assembly comprising, a driving member, a pressure plate mounted for axial movement relative to said driving member and arranged to rotate therewith, a relatively flat annular member of resilient material, means on said driving member providing a bearing support for said annular member adjacent one of its peripheries, and cam means between said pressure plate and said annular member for transferring, at will, pressure from said annular member to said pressure plate, said cam means contacting said annular member adjacent to its other periphery.

11. In a friction clutch driving assembly, as defined in claim 10, means for limiting the deforming of said annular resilient member.

CARL A. RUESENBERG.
MARTIN WILLENE.